United States Patent Office 3,004,927
Patented Oct. 17, 1961

3,004,927
POLYMERIZATION CATALYST
Heinz Wilhelm Meyer, Munich, Germany, assignor to Elektrochemische Werke München A.G., Hollriegelskreuth, Bavaria, Germany
No Drawing. Filed Oct. 20, 1958, Ser. No. 768,055
3 Claims. (Cl. 252—426)

The invention relates to polymerization catalysts.

For the preparation of synthetic polymers, organic peroxides have been used as catalysts. As such peroxides in the pure state are rather dangerous materials, they have been used diluted with a so-called dephlegmator. As dephlegmators, plasticizers have been employed which have a relatively low solvent power for the peroxides so that the catalyst had to be applied in form of a paste. The handling of such pastes is difficult because the catalyst has to be applied in small amounts. Due to the high viscosity of such pasty catalyst compositions, their exact metering is frequently not possible particularly when the polymerization process is carried out on a small scale. An additional drawback of such catalyst pastes is that they are difficult to be incorporated homogeneously in molding resins, which results in unhomogeneous blends of the resin and the catalyst and produces inferior polymers.

It is a principal object of the invention to provide an organic peroxide catalyst in form of a readily handled composition of low viscosity, which allows exact metering and dosage and preparation of homogeneous blends with the material to be polymerized.

Other objects and advantages will be apparent from a consideration of the specification and claims.

I have found that alkyl phosphates are excellent dephlegmators for organic peroxides. I use lower alkyl phosphates, the alkyl groups of which contain not more than 4 carbon atoms, particularly trialkyl phosphates, which have a somewhat higher solvent power than the corresponding di- and mono-alkylphosphates. Said phosphates do not react with the peroxide and are particularly good solvents of peroxides and hydroperoxides of cyclohexanone and hydrocarbon substituted derivatives thereof, in which, for instance, one or more of the carbon-bound hydrogen atoms are replaced by alkyl or aryl groups.

For use as catalysts, such alkyl phosphate solutions containing 15 to 50 preferably 30 to 50 percent by weight of the organic peroxide are employed. Such compositions represent readily flowing liquids of low viscosity.

Example

1'-oxy-1'-hydroperoxy-dicyclohexyl peroxide is dissolved at room temperature in triethyl phosphate to form a solution containing 50 percent by weight of said peroxide. The solution has excellent fluidity and is readily incorporated in exact predetermined amounts in a resin blend.

The following table shows the solubility of various cyclohexanone peroxides in different alkyl phosphates.

A=1,1'-bis-(hydroperoxy)dicyclohexyl peroxide of the formula

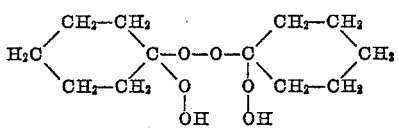

B=1-hydroxy-1'-hydroperoxy dicyclohexyl peroxide

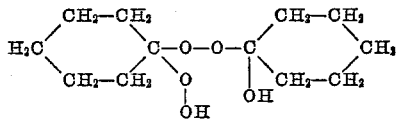

C=1,1'-bis (hydroxy)-dicyclohexyl peroxide of the formula

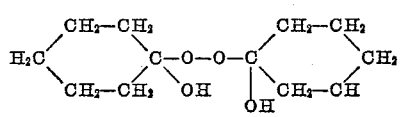

| Peroxide | Solubility at 20° C. in— | | | | |
|---|---|---|---|---|---|
| | Trimethyl phosphate, percent | Triethyl phosphate, percent | Tributyl phosphate, percent | Acid butyl phosphate, percent | Dibutyl phosphate, percent |
| A | 52 | 53 | 43 | 29 | 31 |
| B | 44 | 55 | 48 | 38.5 | 39.5 |
| C | 66 | 63 | 51 | not determined | |

Acid butyl phosphate is a technical grade monobutyl phosphate containing about 30 to 50 percent of dibutyl phosphate.

I claim:
1. A composition useful as a polymerization catalyst comprising a solution of an organic peroxide selected from the group consisting of peroxides and hydroperoxides of cyclohexanone and hydrocarbon substituted derivatives thereof in a lower alkyl phosphate, the alkyl of said alkyl phosphate having 1 to 4 carbon atoms and the concentration of said organic peroxide being about 15 to 50 percent by weight of said solution.

2. A composition useful as a polymerization catalyst comprising a solution of an organic peroxide selected from the group consisting of peroxides and hydroperoxides of cyclohexanone and hydrocarbon substituted derivatives thereof in a lower trialkyl phosphate, the alkyl of said trialkyl phosphate having 1 to 4 carbon atoms and the concentration of said organic peroxide being about 15 to 50 percent by weight of said solution.

3. The composition of claim 2 wherein said trialkyl phosphate is triethyl phosphate.

References Cited in the file of this patent
UNITED STATES PATENTS
2,858,280   Maltha _____ Oct. 28, 1958